A. E. STOLL.
APPARATUS FOR MAKING HYDROGEN PEROXID.
APPLICATION FILED SEPT. 18, 1911.

1,052,626.

Patented Feb. 11, 1913.

Witnesses:

Inventor:
Albert E. Stoll

UNITED STATES PATENT OFFICE.

ALBERT E. STOLL, OF ZOLLIKON, SWITZERLAND.

APPARATUS FOR MAKING HYDROGEN PEROXID.

1,052,626.  Specification of Letters Patent.  Patented Feb. 11, 1913.

Application filed September 18, 1911. Serial No. 649,776.

*To all whom it may concern:*

Be it known that I, ALBERT E. STOLL, director, a citizen of the Swiss Confederation, and residing at Zollikon, Canton of Zürich, Switzerland, have invented new and useful Improvements in Apparatus for Making Hydrogen Peroxid, of which the following is a specification.

This invention relates to the manufacture of hydrogen peroxid from sodium peroxid and water.

Hitherto in the manufacture of hydrogen peroxid the sodium peroxid was introduced into a vessel with water and the necessary amount of acid such as sulfuric acid, the liquid being stirred with a stick or the like. A solution of hydrogen peroxid was then formed. This method of manufacture has great drawbacks. The sodium peroxid being very hygroscopic, the injection devices, such as roses or the like, soon become clogged. Moreover, commercial sodium peroxid is never finely granulated but often contains large lumps which give rise to excessive local heating on contact with the water whereby the hydrogen peroxid, which is generated, is immediately decomposed, a large amount of oxygen being liberated. It is well known that the temperature of the water is appreciably raised by the introduction of the sodium peroxid, which also results in a considerable loss of oxygen approximating 35%. Apart from the fact that the above manufacture consumes much time, it is also rather dangerous for the workmen owing to the caustic nature of the sodium peroxid and its tendency to become ignited in the presence of damp organic substances.

The present invention has for its object an apparatus for the manufacture of hydrogen peroxid by the above reaction, by means of which these drawbacks will be overcome.

The invention consists in an apparatus for the manufacture of hydrogen peroxid, in which the sodium peroxid is placed in a container arranged above the water vessel, a grinding device being located in the outlet of the container.

The improved apparatus also comprises means for agitating the contents of the reaction vessel, and means for keeping the said reaction vessel cool during the manufacture.

An example of the apparatus is diagrammatically illustrated in the accompanying drawings, in which:—

Figure 1:
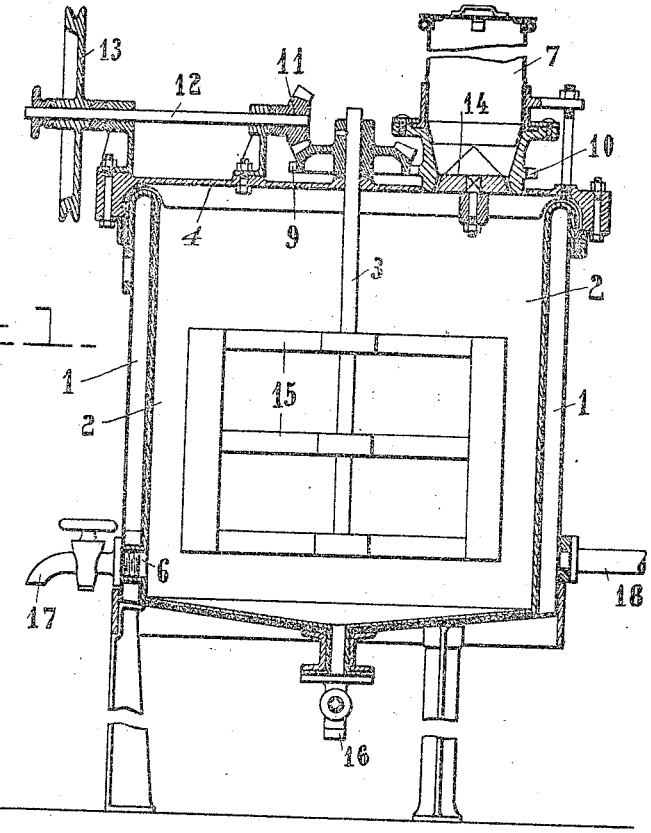
Figure 2:
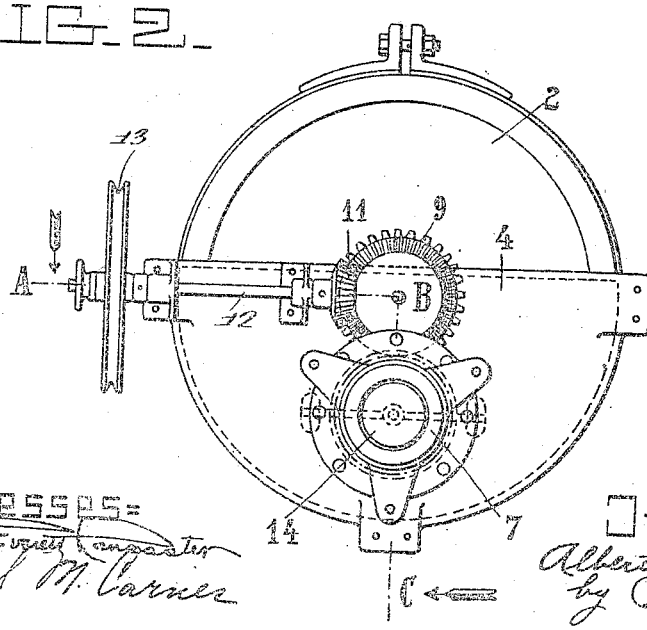

Figure 1 is a sectional elevation on line A—B—C of Fig. 2, Fig. 2 a top view of the apparatus.

The form of invention illustrated has a generating vessel 2 provided with a suitable base plate and open at the top. To protect the walls of the vessel 2 from the action of the acid and the peroxid, these walls are covered with lead or enameled and provided with a cooling jacket 1.

6 denotes outlet for the vessel.

In the vessel 2 is mounted a vertical shaft 3 provided with stirring vanes 15. The shaft 3 is driven through bevel wheels 11, one of which is keyed on a shaft 12, journaled on the cover 4 and having belt pulleys 13.

Above the vessel 2 is arranged a sodium peroxid container 7, consisting substantially of a cylindrical sheet metal vessel with a conical lower end. The bottom opening of the cone contains a grinding device 14 fixed to the cover 4. The container 7 is rotated by means of spur wheels 9, 10, the drive being transmitted from the bevel gear 11. The container 7 is preferably provided with a close fitting cover to protect the sodium peroxid from the action of damp air.

The sodium peroxid is ground to a fine powder by means of the device 14, and then falls into the vessel 2. The water in the latter, treated by means of a suitable acid such as sulfuric acid, is continuously stirred by the vanes 15 so that the sodium peroxid is rapidly dissolved without loss of oxygen. The cooling water circulating between the jacket wall 1 and the vessel 2, absorbs the heat generated by the reaction.

In the manufacture of hydrogen peroxid by means of the hereinbefore described apparatus a loss of oxygen is effectively avoided. The apparatus works completely independently of the operator and much more rapidly than in prior methods of manufacture. A premature decomposition of the sodium peroxid is prevented and the solution of hydrogen peroxid remains cool and therefore very stable.

While I have herein shown and described one specific embodiment of my invention I do not wish to be limited thereto except for such limitations as the claims may impart.

I claim—

1. An apparatus for the manufacture of hydrogen peroxid comprising, a mixing vessel, a water jacket surrounding said vessel, a container adapted to receive sodium peroxid, means to pulverize said sodium peroxid, and means to distribute said sodium peroxid in said vessel.

2. An apparatus for the manufacture of hydrogen peroxid comprising a vessel, lead covering for said vessel, a water jacket surrounding said vessel, an outlet in said vessel, a cover on said vessel, stirring devices fitted in said vessel, a container adapted to receive sodium peroxid, a device on said container adapted to grind the sodium peroxid, substantially as shown and for the purpose set forth.

In testimony whereof I affix my signature in presence of two witnesses.

ALBERT E. STOLL.

Witnesses:
  FRED ISLER,
  AUGUST RÜEGG.